Aug. 14, 1956 J. FIEUX 2,758,478
APPARATUS FOR DETECTING AND TRANSMITTING THE PITCHING AND
ROLLING ANGLES ON BOARD A SHIP, AIRCRAFT OR LIKE CRAFT
Filed April 20, 1955 3 Sheets-Sheet 1

INVENTOR
Jean Fieux
BY
Cameron, Kerkam & Sutton
ATTORNEYS

INVENTOR
Jean Fieux.
BY
Cameron, Kerkam & Sutton
ATTORNEYS

United States Patent Office 2,758,478
Patented Aug. 14, 1956

2,758,478

APPARATUS FOR DETECTING AND TRANSMITTING THE PITCHING AND ROLLING ANGLES ON BOARD A SHIP, AIRCRAFT OR LIKE CRAFT

Jean Fieux, Paris, France, assignor of one-half to Societe des Forges et Ateliers du Creusot, Paris, France Application April 20, 1955, Serial No. 502,570

Claims priority, application France April 28, 1954

5 Claims. (Cl. 74—5.34)

This invention relates to an apparatus for detecting and transmitting the pitching and rolling angles on board a ship, aircraft or like craft.

It is known that such an instrument has to be subjected without undergoing undue deviations, to the accelerations which occur on board a ship or aircraft and to the reactions of the devices used for detecting and transmitting the pitching and rolling angles.

The construction of such an apparatus presents numerous difficulties, in particular the generation and application to the instrument of a torque tending to compensate the centrifugal force occurring when the craft swerves while allowing the instrument to indicate the true angle of pitch or roll.

Another difficulty is due to the fact that it is necessary in practice to give the instrument a complex pendulum construction due to unequal static moments of the respective axes of indication of the rolling and pitching angles, in order to attain the necessary stability and accuracy.

In the apparatus according to the present invention the aforesaid difficulties have been eliminated or reduced to a large extent.

The apparatus according to the invention for the detection and transmission of the pitching and rolling angles of a ship, aeroplane or like craft comprises two coaxial pendulum elements, each suspended on a cardan frame pivoted about an axis of rotation perpendicular to that of the other, the two cardan frames themselves being pivoted on a common fixed base about two axes of rotation perpendicular to one another, the indication of the pitching and rolling angles being effected with respect to these last mentioned axes of rotation by means of two indicators fixed to the base, the first one of these pendulum elements, called a stabilised pendulum, being stabilised by two groups of twin gyroscopes, while the cardan frame on which it is suspended is subject to the action of a compensating flywheel having an axis of rotation perpendicular to the longitudinal axis of the craft and parallel to the axis of rotation of the said stabilised pendulum element, while the second pendulum element takes part in the oscillations of the first one with respect to the vertical about the common intersecting point of the axes of rotation of the pendulum elements and of their cardan frames.

Referring to the accompanying drawings, a particular embodiment of the instrument according to the invention will now be described by way of example.

Figure 1:
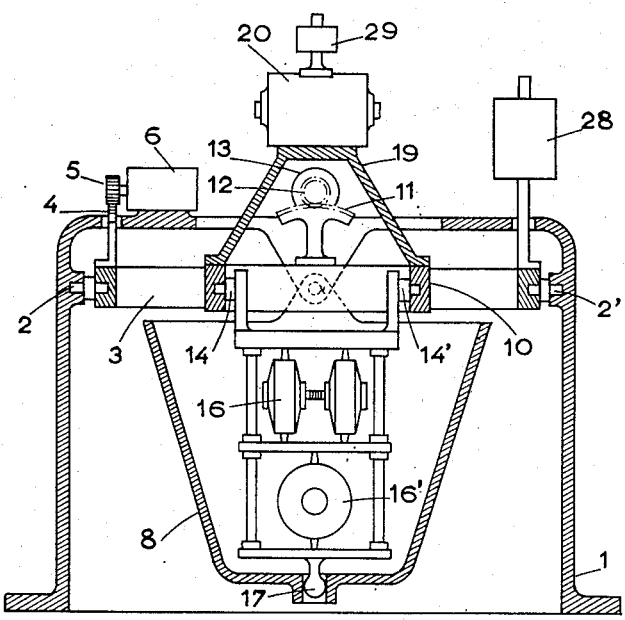
Figure 1 is a vertical section perpendicular to the longitudinal axis of the craft.
Figure 2:
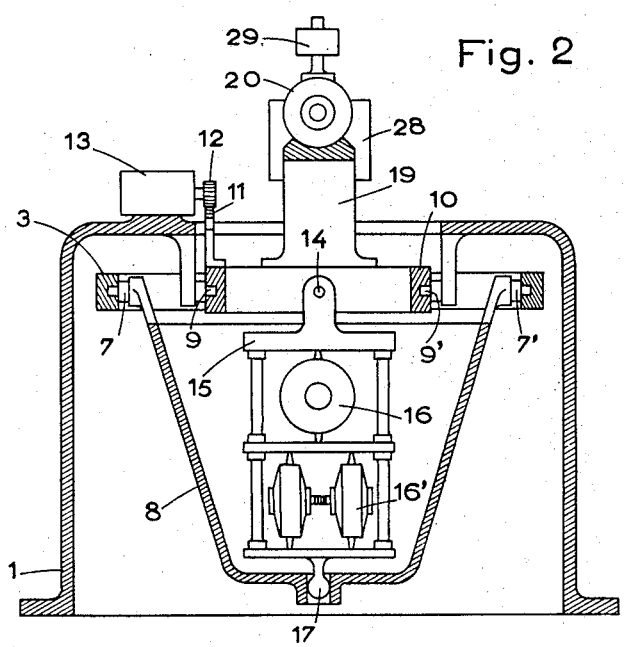
Figure 2 is a vertical section parallel to the longitudinal axis of the craft.

In these drawings, 1 indicates the base of the instrument which is fixed to the craft.

By means of the pivots 2 and 2' perpendicular to the longitudinal direction of the craft a frame 3 is articulated to the base which forms the reference for the indication of the pitching angles and carries for this purpose a toothed segment 4 in engagement with the pinion 5 of the transmitter 6 which is fixed to the base.

By means of the pivots 7 and 7' the axis of which is perpendicular to that of the pivots 2, 2', a pendulum 8, is pivoted on the frame 3.

On the base 1 there is moreover articulated, by means of the pivots 9, 9' parallel to the longitudinal direction of the craft a frame 10 which forms the reference element for the indication of the rolling angles, and for this purpose carries a toothed segment 11 in engagement with the pinion 12 of the transmitter 13 fixed to the base.

On the frame 10, by means of the pivots 14, 14' the axis of which is perpendicular to that of the pivots 9, 9', a pendulum 15 is suspended which is stabilised in a known manner by two groups of twin gyroscopes 16 and 16'.

Figure 4:
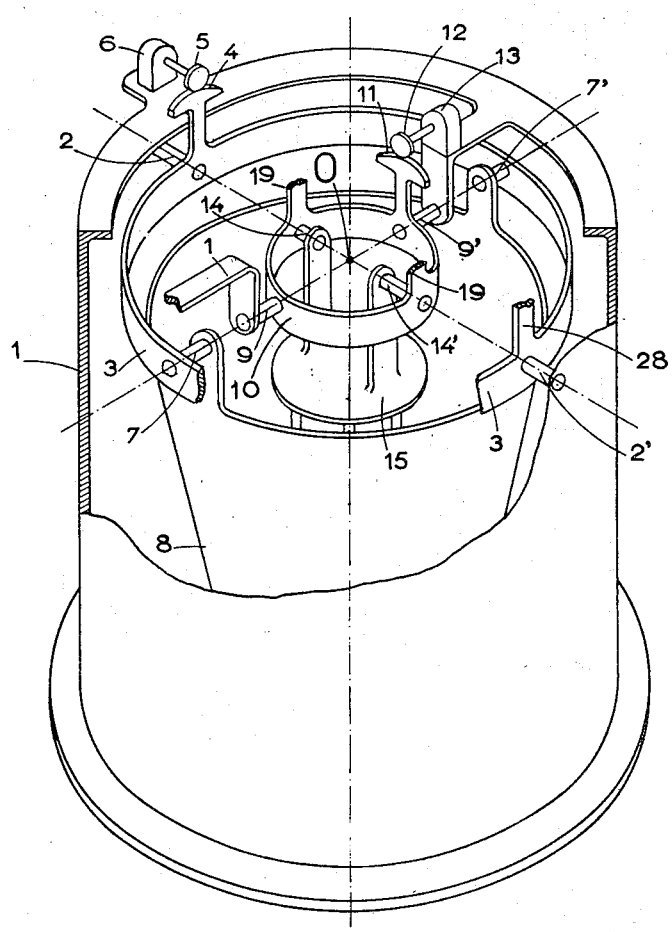
Figure 4 is a diagrammatic part view in perspective showing the different suspension articulations.

The axes of rotation 2—2', 7—7', 9—9' and 14—14' intersect one another in a common point 0 (Figure 4).

At its lower portion the pendulum 15 carries a spherical finger 17 which engages a guide fixed to the pendulum 8 in such a manner that these two pendulums are fixedly coupled to one another in their movements with respect to the vertical about the common point 0.

On the frame 10, which supports the pendulum 15, by means of a stirrup 19, a casing 20 is fixed in the interior of which a compensating flywheel is arranged.

Figure 3:
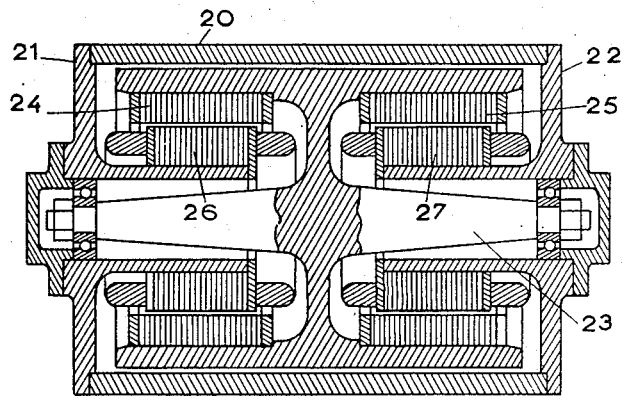
Figure 3 is an axial section of a compensating flywheel.

As shown in Figure 3 the two flanges 21 and 22 of the casing 20 carry the bearings of the compensating flywheel 23 which is provided with laminated rotatable masses 24 and 25, and stators 26 and 27 which are wound differently in order to produce two different speeds of rotation.

On the frame 3, a mass 28 is fixed, the distance of which from the axis of rotation 2—2', is adjustable; this mass determines the pendulum characteristics of the two pendulums with respect to the line 2—2', while the pendulum characteristics of the assembly with respect to the axis 9—9' is determined by a mass 29 fixed above the casing 20 of the compensating flywheel.

The compensating flywheel 23 is subject to a gyroscopic torque which is a function of its own velocity and of the angular velocity due to the swerving of the craft.

It will be understood that for a certain speed of rotation of the flywheel 23, the gyroscopic moment generated by the said flywheel during the swerving of the craft can compensate in magnitude and in sense for the centrifugal force applied to the pendulum.

Strictly speaking, in order to attain a complete compensation, it would be necessary to regulate in a continuous manner the rotational speed of the flywheel as a function of the speed of the craft. However, by limiting the control to two selected speeds, for example the points 14 and 21 in Figure 5, the error in the instrument could be limited, whatever the speed of the craft may be, to a small fraction of the error which would have been observed in the absence of this compensation.

Figure 5:
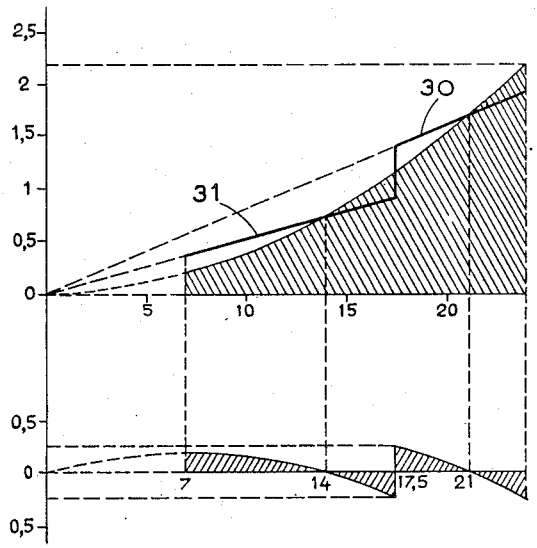
Figure 5 is a double diagram showing the compensating action of the compensating flywheel.

In the upper graph of Figure 5 the parabola represents the centrifugal acceleration, and consequently, the deviation which the pendulum assembly would tend to take, as a function of the speed of the craft, whereas the line 31 represents the gyroscopic compensating reaction due to the flywheel 23, the speed of which jumps to its higher value when the speed of the craft passes through the point 17, 5 on the graph.

In the lower graph of Figure 5 the shaded portions represent the residual errors given by the indicator for various speeds of the craft.

These graphs are drawn for the selected speeds 14 and 21; the numbers plotted in the abscissa and in the ordinates express respectively the speeds and the deviation of the indicator in degrees, with respect to the true speed.

It should be noted that the moment of acceleration of the flywheel from one speed to another has little effect on the indicator since the reaction is completely absorbed by means of the pivots 9—9′.

It will also be noted that the pitching angle given by the instrument is a true reading, but the given rolling angle is the angle of rotation about the longitudinal axis of the craft which may not be horizontal if the craft is pitching. The error arising from pitching angles smaller than 5° is, however, small enough to be neglected.

It will finally be noted that the various pivots can rotate freely, the only connections to be established between the base and the pendulum assembly being used merely to supply current to the gyroscopes and to the compensating flywheel, an earth return for the current being used to secure the number of wires needed.

The instrument described by way of example can be modified without departing from the scope of the invention as defined in the appended claims.

Thus, for example, for the purpose of reducing height of the instrument the two groups of twin gyroscopes could be arranged on the same level as the stabilised pendulum element, the gyroscopic effect being then attained by linkage in the usual way, instead of by the meshing of toothed segments such as those illustrated in the accompanying drawings.

What I claim is:

1. An apparatus for the detection and transmission of the pitching and rolling angles of a ship, aeroplane or like craft comprising two coaxial pendulum elements, each suspended on a cardan frame pivoted about an axis of rotation perpendicular to that of the other, the two cardan frames themselves being pivoted on a common fixed base about two axes of rotation perpendicular to one another, the indication of the pitching and rolling angles being effected with respect to these last mentioned axes of rotation by means of two transmitters fixed to the base, the first one of these pendulum elements, called a stabilised pendulum, being stabilised by two groups of twin gyroscopes, while the cardan frame on which it is suspended is subject to the action of a compensating flywheel having an axis of rotation perpendicular to the longitudinal axis of the craft and parallel to the axis of suspension of the said stabilised pendulum element in its cardan frame, while the second pendulum element takes part in the oscillations of the first one with respect to the vertical about the common intersecting point of the axes of rotation of the pendulum elements and of their cardan frames.

2. An apparatus according to claim 1, in which the stabilised pendulum element is disposed in the interior of the second pendulum element, the two pendulum elements being rigidly joined together at their lower ends.

3. An apparatus according to claim 1, in which means are provided for driving the transmitter of the pitching angles as the cardan frame on which the second pendulum element is suspended moves about its pivot, which is perpendicular to the longitudinal axis of the craft.

4. An apparatus according to claim 1, in which means are provided for driving the transmitter of the rolling angles as the cardan frame on which the stabilised pendulum element is suspended moves about its pivot which is parallel to the longitudinal axis of the craft.

5. An apparatus according to claim 1, in which the frame of the stabilised pendulum element carries a casing for said compensating flywheel and an adjustment mass mounted thereon which determines the pendulum characteristic of the suspended system in the plane of rolling, and in which the cardan frame of the second pendulum element is influenced by a mass which defines the pendulum characteristic of the said assembly in the plane of pitching.

References Cited in the file of this patent

UNITED STATES PATENTS

| | | |
|---|---|---|
| 1,066,860 | Sparman | July 8, 1913 |
| 1,324,477 | Tanner | Dec. 9, 1919 |
| 2,539,772 | Dawson | Jan. 30, 1951 |